United States Patent Office

3,276,879
Patented Oct. 4, 1966

3,276,879
METHOD OF TENDERIZING MEAT
Otmar O. Silberstein, Gilroy, Calif., assignor to Baxter Laboratories, Inc., Morton Grove, Ill., a corporation of Delaware
No Drawing. Filed June 18, 1964, Ser. No. 376,261
6 Claims. (Cl. 99—107)

This application is a continuation-in-part of U.S. application No. 250,221, filed January 9, 1963, now abandoned.

The present invention relates to the tenderization of meat. More particularly, it relates to a novel method for the tenderization of meat.

In the past, a wide variety of methods have been employed in an effort to provide satisfactory tenderization of the meat. A great many of these methods have employed as an essential ingredient a proteolytic enzyme. However, none of these methods have been entirely satisfactory, and they accordingly have not met with wide spread acceptance by packers, processors or consumers. The lack of acceptance has been due in a large part to the inconsistency of the tenderization. In many cases, such as the live injection method which depends upon the animal's own circulatory system to distribute the enzyme, the tenderization has been so unevenly distributed that the same carcass contains sections of meat which had been both under and over tenderized. In still other of the previously known processes such as dipping the cut of meat into a tenderizing bath, or sprinkling a tenderizer on the surface areas, the results have been an overtenderization of outer surface areas and no tenderization in the interior areas of the cut. This was especially true in case of roasts and the like. Furthermore, the meat treated by many of the previously known methods has been required to be continuously refrigerated to arrest the excess enzyme activity and to prevent overtenderization.

It is an object of the present invention to disclose a method for the tenderization of meat which overcomes the disadvantages of the previously known methods.

It is a further object to provide methods and compositions which allow for the selective tenderization of the meat.

It is a still further object to disclose enzymatic methods and compositions for tenderization that do not require that the treated meat be subsequently treated to arrest or inhibit the enzymatic activity. These and still other objects are obtained by the practice of the present invention, which will be disclosed and discussed in detail in the specification as it proceeds.

It has now been discovered in accordance with an aspect of this invention that all the foregoing advantages and objects can be obtained by the method which comprises forcibly injecting into selected portions of the carcass of a freshly slaughtered domestic meat-producing animal about 1% to 4% as based on the "hot" weight which is the dressed weight of the freshly killed carcass, of a proteolytic enzyme solution having an activity of about 0.01 to 0.05 Milk Clotting units per gram. Preferably, the method comprises injecting more enzyme into the less tender portions of the carcass and less enzyme into the more tender portions of the carcass.

In accordance with another aspect of this invention, compositions are provided which when utilized for the tenderization of meat are consistent in performance and effectuate relatively uniform tenderization throughout the carcass without the significant danger of over tenderization resulting from the practice of other prior used compositions and methods. A composition of this invention comprises a mixture of a proteolytic enzyme and an osmotic pressure producing material, one gram of the composition having a protetolytic activity of 0.01 to 0.05 M. C. units per gram in an isotonic solution thereof. The osmotic pressure producing material may comprise one or a plurality of different osmotic pressure producing materials, such as sodium chloride, dextrose, and monosodium glutamate. Also one or a plurality of proteolytic enzymes may be employed such as papain, ficin and bromelain, and various animal and microbial proteases. The solid composition is dissolved in water in order to produce an approximately isotonic solution. Such approximately isotonic solutions will have a proteolytic enzyme activity of 0.01 to 0.05 Milk Clotting units per gram of solution. If desired, such solutions may be prepared directly and utilized as such for the tenderization of meat. For example, a liquid meat tenderizing preparation may be prepared by producing an aqueous solution containing 26.5 to 37.5 grams of sodium chloride per gallon and sufficient proteolytic enzyme so that the proteolytic activity of the solution is 0.01 to 0.05 Milk Clotting units per gram of solution. Alternatively, a meat tenderizing composition may be prepared by mixing together 26.5 to 37.5 grams of sodium chloride and sufficient proteolytic enzyme such as papain, ficin or bromelain, and various animal and microbial proteases so that upon dissolving it in one gallon of water a solution is obtained which is approximately isotonic and has a proteolytic activity of about 0.01 to 0.05 Milk Clotting units per gram of solution.

The enzyme preferred for use in the present invention is papain. The papain of commerce is derived from the latex of the tropical plant *Carica papaya* L. Other enzymes which may be used include bromelain, ficin and various animal and microbial proteases.

The proteolytic activity of the papain in Milk Clotting units is determined by the Milk Clotting assay method as originated by Ball and Hoover (J. Biol. Chem. 121, 773; 1937), and modified by Hinkel and Alford (Ann. N.Y. Acad. Sci. 54, 211; 1951). The enzyme preparation is dissolved in a buffered cysteine hydrochloride solution of pH 6 and is tested at 40° C. with a 20% buffered milk solution previously standardized against a standard papain preparation of 300 units/g. The time required from the addition of the enzyme until clotting of the milk begins is measured. The results are expressed in "Milk Clotting units" or M.C. units. A detailed description of the Milk Clotting assay follows:

Pipette 25.0 ml. of the milk solution, described hereinafter, into each of a series of test tubes (25 x 150 mm.) and close them with rubber stoppers. The tubes should then be placed in a constant temperature bath at $40 \pm 0.5°$ C. and allowed to reach temperature equilibrium (15 minutes). Caution must be exercised because the assay is quite sensitive to temperature variation (e.g. changes of 1.0° C. will introduce an error of about 10% in the result).

The enzyme to be tested is dissolved in 0.035 molar cysteine solution. This solution may be prepared by dissolving 6.3 grams $Na_2HPO_4$, 14.0 grams disodium ethylenediaminetetraacetate dihydrate and 6.1 grams L(+) cysteine hydrochloride monohydrate in 1,000 ml. of distilled water. Usually about 4 ml. of 5 N sodium hydroxide are required to adjust this solution to a pH of 6.0. The approximate enzyme concentration should be about 0.5 units per milliliter. The enzyme solution should be prepared immediately before use; and, solutions not used for assay within thirty minutes should be discarded.

Using a volumetric pipette, withdraw exactly 2.00 ml. of the enzyme solution and discharge the contents into one of the milk containing tubes. Stopper the tube, shake it briefly, but gently, so as to avoid the inclusion of air bubbles, and return to the constant temperature bath.

Using a stop watch (preferably one subdivided into hundredths of a minute), measure the time from the addition of the enzyme solution until clotting of the milk begins. The tube should be rolled gently back and forth in a horizontal position while in the bath. Less than one minute prior to clotting, the milk will appear to thicken somewhat and will no longer drain readily from the walls of the tube. The smooth film of milk should be watched closely from this point on. The end point is taken as the almost instantaneous appearance of a granular character in the milk film. The time required for the end point to be reached should be not less than one and not more than five minutes; shorter or longer periods of time will result in larger errors.

The solutions employed in Milk Clotting assay are the following:

*Dilute buffer.*—Two volumes of molar acetic acid solution are mixed with one volume of molar sodium hydroxide solution. The resulting buffer solution should be about pH 4.5. Two volumes of the thus prepared concentrated buffer solution are further diluted with 15 volumes of distilled water.

*Milk solution.*—One hundred grams of dry milk powder (e.g. Starlac brand sold by The Borden Company) should be thoroughly mixed with 425 ml. of the dilute buffer solution in a blender or similar device. A trace of octyl-alcohol (2-ethyl-1-hexanol) may be added to decrease foaming during the mixing operation. Filter the mixture through cheesecloth into a clean bottle. A few drops of toluene should be added as a preservative. The resulting milk solution should be allowed to stand a few hours before use. This solution will keep satisfactorily for about a week under refrigeration.

CALCULATION

Milk Clotting units per gram (MC) are calculated from the following equation:

(a) $$MC = \frac{100mv}{wt}$$

where:

$w$ = milligrams of enzyme added to milk
$t$ = time in minutes
$m$ = milk factor
$v$ = volume of milk in milliliters The milk factor, $m$, is established by conducting an assay with a reference standard enzyme (available upon request from Wallerstein Company of Staten Island, N.Y.) and using Formula $b$ to calculate the value.

(b) $$m = \frac{(MC)wt}{100v}$$

Where: (MC) represents the value of the reference standard and the values $w$, $t$, and $v$ are as indicated for Formula $a$.

For a freshly prepared milk solution, $m$ will have a value of about 1.7. After a week under constant refrigeration, the value of $m$ will be about 1.4. For precise work, $m$ should be determined each day by calibration of the milk solution with an arbitrary enzyme standard. Proper technique will allow results to be reproduced with an accuracy of about ±5.0%.

In accordance with this invention sufficient enzyme is dissolved in water which contains suitable osmotic pressure producing materials to form an approximately isotonic solution having an activity of 0.01 to 0.05 M.C. units and desirably 0.02 to 0.025 M.C. units per gram. The solution is then pressure injected into those areas of the carcass of the animal it is desired to tenderize. The amount of solution pumped into the animal carcass is closely controlled not to exceed 4% of the dressed weight of the freshly killed carcass. (Preferably it ranges from 2 to 3% of the dressed weight.)

In the preferred practice of this invention the compositions containing the enzyme are supplied to the user as a dry powder generally in combination with the osmotic pressure producing materials. The user then dissolves the enzyme composition in a specific amount of water to obtain an aqueous approximately isotonic solution having the desired enzyme activity.

Especially preferred as a composition of this invention is a solid mixture containing a sufficient amount of enzyme and sodium chloride or other osmotic pressure producing materials to produce a solution having an activity of 0.01 to 0.05 M.C. units which is also isotonic, i.e. a solution with an osmotic pressure equivalent to about 0.85% sodium chloride. For example, a solid mixture comprised of 26.5 to 37.5 grams of salt and sufficient enzyme to give the resulting solution an activity of 0.01 to 0.05 M.C. units per gram may be dissolved in one gallon of water to form a suitable solution.

In some instances it may be desired to supply the user of the process of this invention with an approximately isotonic enzyme solution, or a concentrated solution which can be diluted to form an approximately isotonic solution, in contrast to a solid mixture of the enzyme and osmotic pressure producing materials. Especially preferred as a solution is an aqueous solution which contains sufficient proteolytic enzyme to have a proteolytic activity of about 0.01 to 0.05 M.C. units, and which has an osmotic pressure equivalent to 0.70 to 1.0% of sodium chloride solution. The use of an approximately isotonic enzyme solution is preferred because of the undesirable effects encountered with solutions which are markedly hypertonic or hypotonic.

The use of hypotonic solutions results in the passage of moisture through the cell walls and into the cells of the meat where the salt concentration is higher. The net result of the use of such solutions is an adverse effect on the texture and flavor of the treated meat. The removal of the excess moisture from within the cells is time consuming and may further adversely affect the texture and flavor of the meat. On the other hand, the use of a hypertonic solution results in a dehydration of the cells because the moisture normally within the cells passes out of the cells by osmosis. The resulting dehydration of the cells adversely effects both the texture and flavor of the meat.

It is not necessary that the carcass to be tenderized be prepared in any unusual manner prior to the practice of the present invention. However, for satisfactory results the carcasses should be treated promptly after slaughter while they are still flaccid and warm, i.e. before the effects of rigor mortis can interfere with the distribution of the enzyme preferably within 45 minutes after slaughter. When the enzyme solution is promptly injected the distribution of the solution is far superior to that obtained by the "live injection" or any other previously known method.

The injection of the enzyme solution is conducted under pressure. To insure adequate distribution the pumping pressure can, of course, vary within reasonable limits. However, extremely high pressure may cause mechanical destruction of tissue which results in local overtenderization. Generally, a pressure is employed which falls within the range of 20 to 70 p.s.i. Especially preferred, however, are pressures of about 25 to 35 p.s.i.

The exact volume of a given enzyme solution to be injected varies with the relative tenderness of the particular anatomical section of the carcass being injected, and that of the carcass itself. With a given carcass the volume of enzyme solution to be injected varies with the relatively less tender anatomical sections receiving a larger volume of a given enzyme solution than the more tender sections. For example, a less tender anatomical section of the carcass might receive a volume of given solution approaching the 4% upper limit and a more tender anatomical section might receive a lesser volume of solution. Alternatively, in some instances it may be considered more desirable to selectively tenderize particular anatomical sections of the carcass by injecting a more concentrated enzyme solution into a less tender section of the carcass and a like volume of a less concentrated solution into a more tender section.

The practice of the present invention is further illustrated by reference to the following example.

*Example*

The carcass of a freshly slaughtered steer was split in half. One half of the carcass was treated by injecting an approximately isotonic enzyme solution into the meat through a pumping fork comprising a hollow needle holder with 8 hollow needles each 4 to 5 inches in length and provided with 8 to 10 holes distributed along the stem of the needle. The rate of pumping was controlled by a constant volume injector calibrated to deliver 105 ml. per stroke. The solution was pumped via the described apparatus into the rounds, loins, chuck and rib sections of the carcass. During the injection step precaution was exercised to insure an even distribution of the solution intramuscularly as opposed to intermuscularly.

The solution pumped into the one half of the animal had an enzyme activity of 0.021 M.C. units of papain per gram and contained 31.6 grams of sodium chloride and per gallon of solution. A solution containing the same additive, but no enzyme was pumped in an identical manner into the control half. The amount of solution added to each was equivalent to about 1.8% of the "hot" weight of the meat.

After injection the sides were handled in accord with routine packing house procedure i.e. they were spray-washed, shrouded and refrigerated for 48 hours.

The halves of beef were then cut into quarters and subdivided to form rib steaks, rib roasts, round steaks, round roasts and the like. The various cuts of meat from both treated and control halves of beef were then prepared for consumption in a conventional manner.

The results of a taste test panel indicated that the taste, odor and flavor of the control and the treated meat were identical. However, the treated meat was judged to be more tender than the control by a statistically significant percentage of the taste panel.

The needles employed in the practice of the present invention and their manner of placement within the carcass are especially designed to promote the intramuscular distribution of the enzyme solution. The intramuscular deposition of the enzyme solution contributes to the superior benefits obtained by the practice of the present invention, whereas, the intermuscular deposition of the solution is to be avoided, because it results in the formation of pockets of solution and other undesirable distribution patterns which may diminish the effectiveness of the process.

The needles preferred for use in the inventive process are about 4 to 5 inches long and are provided along three-quarters of their length with very fine holes (0.025 inch in diameter). The needles are crimped near their upper end so they can be held in place by and oriented within the needle holder. The needles are oriented within the holder to avoid an overlapping in the spray patterns produced by adjacent needles. Preferably they orient in such a way that all adjacent holes are rotated by 90°.

It will be readily apparent to those skilled in the art that the foregoing example indicates that a significant tenderization of the meat takes place when the practice of the present invention is used.

It will be understood, of course, that a number of modifications and changes may be made without departing from the spirit and scope of the present invention.

What I claim is:

1. The improvement in the tenderization of meat which comprises injecting intramuscularly into the warm and flaccid carcass of a freshly killed meat-producing animal, at pressures of from about 20 to about 70 p.s.i. proteolytic enzyme solution having an activity of 0.01 to 0.05 M.C. units per gram in an amount equivalent to 1% to about 4% of the dressed weight of the freshly killed carcass.

2. The method of tenderizing meat which comprises preparing a solution having a proteolytic enzyme activity of about 0.01 to 0.05 M.C. units per gram and then pumping intramuscularly into the warm and flaccid carcass of a freshly killed meat animal which is desired to be tenderized, at pressures of from about 20 to about 70 p.s.i., an amount of the enzyme solution equivalent to about 1% to 4% as based on the weight of the carcass.

3. The method of tenderizing meat which comprises injecting intramuscularly an enzyme solution under pressure uniformly into a warm and flaccid freshly killed meat animal carcass, at pressures of from about 20 to about 70 p.s.i., said enzyme solution containing papain and having an enzyme activity of about 0.01 to 0.05 M.C. units per gram, the amount of said solution injected being equivalent to 1% to about 4% by dressed weight of the freshly killed carcass.

4. The method of tenderizing meat which comprises injecting intramuscularly into selected anatomical areas of the warm and flaccid, dressed carcass of a freshly killed meat animal, at pressures of from about 25 to about 35 p.s.i., a proteolytic enzyme solution having a proteolytic activity of 0.01 to 0.05 M.C. units per gram, the solution being introduced in an amount of about 1% to 4% by weight of the selected anatomical areas of the warm and flaccid, dressed carcass.

5. The method of tenderizing meat which comprises injecting intramuscularly into the warm and flaccid carcass of a freshly killed beef animal, at pressures of from about 20 to about 70 p.s.i., varied amounts of a proteolytic enzyme solution having a proteolytic activity of 0.01 to 0.05 M.C. units per gram, the total amount of the solution being equivalent to 1% to about 4% by dressed weight of the freshly killed animal, a larger amount of said solution being injected into the less tender areas of the carcass and a lesser amount of said solution being injected into the more tender meat areas of the carcass.

6. A method of tenderizing meat which comprises injecting intramuscularly into selected anatomical areas of the warm and flaccid carcass of a freshly killed beef animal, at pressures of from about 20 to about 70 p.s.i., varying concentrations of a proteolytic enzyme solution having a proteolytic activity of 0.01 to 0.05 M.C. units per gram, the total amount of the solution being equivalent to 1% to about 4% by dressed weight of the freshly killed animal, the concentration of the enzyme solution injected into the relatively less tender anatomical areas of the carcass being greater than that injected into the relatively more tender anatomical areas.

References Cited by the Examiner

UNITED STATES PATENTS

| | | | |
|---|---|---|---|
| 2,140,781 | 12/1938 | Allen | 99—107 |
| 2,805,163 | 9/1957 | Williams. | |
| 2,825,654 | 3/1958 | Vaupel | 99—107 X |
| 2,904,442 | 9/1959 | Underkofer | 99—107 X |
| 2,999,020 | 9/1961 | Williams | 99—107 |
| 3,037,870 | 6/1962 | Schleich et al. | 99—107 X |
| 3,056,680 | 10/1962 | Williams | 99—107 |
| 3,122,440 | 2/1964 | Williams | 99—107 |

A. LOUIS MONACELL, *Primary Examiner.*

HYMAN LORD, *Examiner.*